Jan. 6, 1931.　　　F. KUTSUKIAN　　　1,788,061
SPRING SUSPENSION
Filed Oct. 30, 1929
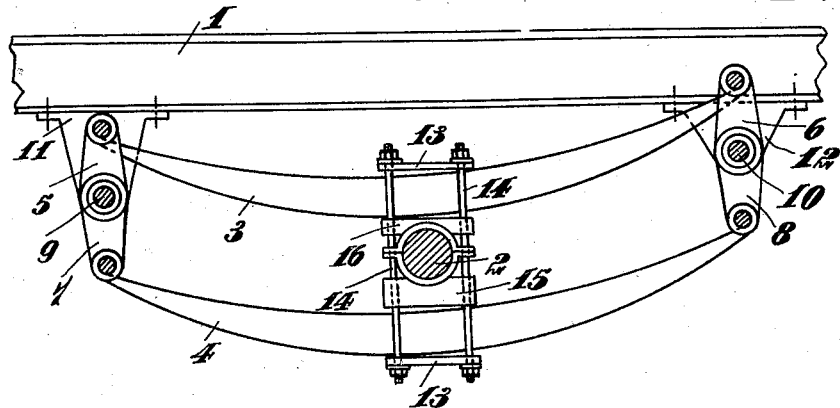
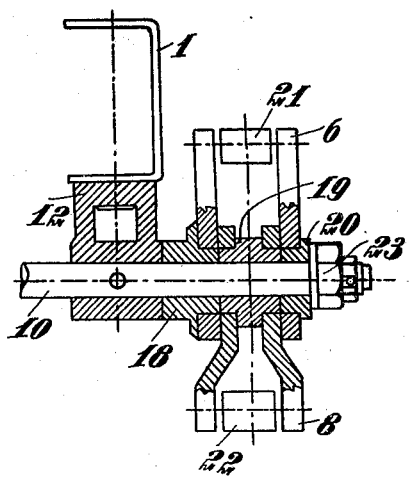
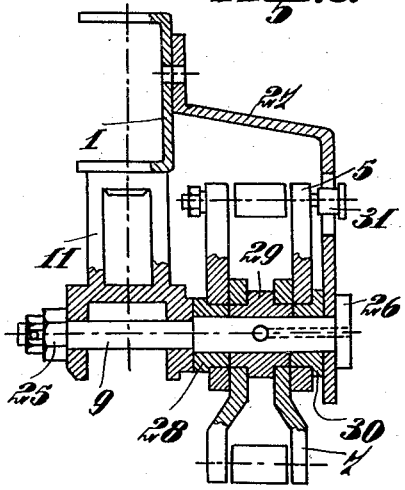
Inventor.
Frank Kutsukian.
per: Jevers
Attorney.

Patented Jan. 6, 1931

1,788,061

UNITED STATES PATENT OFFICE

FRANK KUTSUKIAN, OF MERXEM-ANTWERP, BELGIUM

SPRING SUSPENSION

Application filed October 30, 1929, Serial No. 403,610, and in Belgium November 10, 1928.

The present invention concerns a means for mounting an axle in a lorry, trailer or like vehicle and it relates more particularly to vehicles comprising longitudinal spring suspensions connected to longitudinal frame members by shackles.

The present invention has for its object to provide a means for mounting an axle in a vehicle, whereby the load transported by the vehicle may be considerably increased and the shocks imparted to the vehicle, when its wheels encounter obstacles, damped as perfectly as possible.

For this purpose, according to the invention, the axle is supported at both ends by twin springs which are disposed in relation to the chassis in such a way that the shocks and jerks are imparted to said springs along directions at right angles to the planes of their leaves.

With this object in view, the points of suspension of the fore and aft ends of the springs are located at different levels in height and the difference in level is such that, when the vehicle has its full load, the efforts imparted to the chassis by the shocks and jerks are decomposed in equal parts at the four points of suspension of the springs.

The twin springs are of the semi-elliptic kind, connected to each other by a common fastening device including a bearing for the axle.

Other characteristic features of the invention will appear from the following description, in which reference is to be had to the figures of the accompanying drawing, which illustrate, merely by way of example, an embodiment of the invention.

Fig. 1 is a diagrammatic side view of the device according to the invention, showing the axle but not the wheels supported thereby;

Fig. 2 is a transverse section through the fore ends of the springs and the means for connecting same to the chassis;

Fig. 3 is a similar section through the rear ends of the springs and the means for connecting same to the chassis.

On these figures, 1 designates a longitudinal frame bearer and 2 an axle connected to said frame bearer by a pair of semi-elliptic springs 3 and 4. These springs are attached to the bearer 1, through the medium of pairs of independent shackles 5—7 and 6—8 respectively, pivotally mounted on spindles 9 and 10 respectively, journalled in bearings 11 and 12 depending from the bearer 1.

The springs 3 and 4 are connected to each other by a single fastening means 13, the shanks 14 of which pass through two half bearings 15 and 16 for the axle 2, which are maintained in fixed position between the springs 3 and 4.

As can be seen on the drawings, the pivot 9 of the shackles 5 and 7 is disposed at a lower level than the pivot 10 of the shackles 6 and 8, so that the fore ends of the springs 3 and 4 are at a higher level than the rear ends thereof, whereby the greatest camber of the spring is inclined to the vertical in the direction of movement of the vehicle. Owing to this arrangement, the shocks and jerks received by the wheels and the direction of which is also inclined to the vertical, are imparted to the springs along directions at right angles to the planes of their leaves; thereby a better damping is obtained.

In a preferred form of construction of the front connecting means for the springs illustrated on Fig. 2, the pivot 10 is supported by a bracket 12 secured by any appropriate means to the frame member 1.

Shouldered sleeves 18, 19 and 20 retain the shackles 6 and 8 in their correct position. The fore ends of the springs 3 and 4 are pivotally connected to bolts 21 and 22 respectively, which pass through the shackles 6 and 8. A nut 23 maintains the whole device in position.

The rear connection device for the springs 3 and 4 is illustrated on Fig. 3. A bracket 11 is secured to the frame member 1 and a spindle 9 is journalled therein. The shackles 5 and 7 supporting the rear ends of the springs 3 and 4 are pivotally mounted on said spindle 9.

It will be seen, on comparing Figs. 2 and 3, that the part 11 is of greater length than the part 12, whereby the rear ends of the springs are supported at a lower level than the front ends, so that the springs are inclined to the vertical. In this manner, the efforts are transmitted to the leaves and the fastening device 13 at right angles thereto.

The spindle 9 is constituted by a bolt maintained in position by a nut 25 and the shoulder 26 of said spindle is intended rigidly to retain the lower end of the mud-guard 27, the upper end of which is secured by any appropriate means to the frame member 1, the object of this mud-guard being to protect the rear suspension against the projection of mud from the wheels.

As in the device illustrated on Fig. 2, the shackles 5 and 7 are maintained in position by shouldered sleeves 28, 29 and 30. Greasing bolts 31 may be disposed in the proper places, in order to effect the usual lubrication of the moving parts.

It is obvious that any number of pairs of twin spring suspensions may be mounted on a same lorry or vehicle frame.

The device also allows of inclining the camber of the springs in the opposite direction, by modifying the relative lengths of the elements 11 and 12.

It must be understood that the device according to the invention may be modified as to the details of construction, without departing from the scope of the invention.

I claim:—

In a vehicle having a chassis and axles, a spring suspension at both sides of the chassis including two semi-elliptic leaf springs parallel to one another, having connections intermediate their ends with an axle, one spring being located above the other below said axle, and rocking connections at both their ends with the chassis comprising two brackets secured to the chassis, spindles projecting from said brackets at different levels in height, three shouldered sleeves arranged end to end on each spindle, two independent shackles pivotally mounted on said sleeves between the shoulders thereof and respectively pivotally connected to the corresponding ends of the two springs, and means to maintain the sleeves in end to end position on the spindle.

In testimony whereof I have signed hereunto my name.

FRANK KUTSUKIAN.